(12) United States Patent
Tannenbaum et al.

(10) Patent No.: US 10,360,034 B2
(45) Date of Patent: Jul. 23, 2019

(54) SYSTEM AND METHOD FOR MAINTAINING DATA IN A LOW-POWER STRUCTURE

(71) Applicant: Samsung Electronics Co., Ltd., Suwon-si, Gyeonggi-do (KR)

(72) Inventors: David C. Tannenbaum, Austin, TX (US); Srinivasan S. Iyer, Austin, TX (US); Mitchell K. Alsup, Austin, TX (US)

(73) Assignee: Samsung Electronics Co., Ltd. (KR)

( * ) Notice: Subject to any disclaimer, the term of this patent is extended or adjusted under 35 U.S.C. 154(b) by 81 days.

(21) Appl. No.: 15/633,746

(22) Filed: Jun. 26, 2017

(65) Prior Publication Data
US 2018/0300131 A1 Oct. 18, 2018

Related U.S. Application Data

(60) Provisional application No. 62/486,957, filed on Apr. 18, 2017.

(51) Int. Cl.
*G06F 9/30* (2018.01)
*G06F 9/38* (2018.01)
*G06T 1/20* (2006.01)
*G06T 1/60* (2006.01)

(52) U.S. Cl.
CPC ........ *G06F 9/3009* (2013.01); *G06F 9/30036* (2013.01); *G06F 9/30043* (2013.01); *G06F 9/30098* (2013.01); *G06F 9/3867* (2013.01); *G06T 1/20* (2013.01); *G06T 1/60* (2013.01)

(58) Field of Classification Search
CPC ... G06T 1/20; G06T 2200/28; G06T 2210/52; G06F 9/4881
USPC ......................................................... 345/506
See application file for complete search history.

(56) References Cited

U.S. PATENT DOCUMENTS

| | | | |
|---|---|---|---|
| 5,623,650 A * | 4/1997 | Beard | G06F 8/433 712/234 |
| 6,195,744 B1 | 2/2001 | Favor et al. | |
| 6,922,414 B1 | 7/2005 | Gunlock | |
| 7,152,152 B2 | 12/2006 | Barrick | |
| 7,251,721 B1 | 7/2007 | Nguyen et al. | |
| 8,375,196 B2 | 2/2013 | Björklund et al. | |
| 9,009,712 B2 | 4/2015 | Schmit et al. | |

(Continued)

FOREIGN PATENT DOCUMENTS

KR 19890015129 A 10/1989

*Primary Examiner* — Vu Nguyen
(74) *Attorney, Agent, or Firm* — Renaissance IP Law Group LLP (57) ABSTRACT

A graphics processing unit may include a register file memory, a processing element (PE) and a load-store unit (LSU). The register file memory includes a plurality of registers. The PE is coupled to the register file memory and processes at least one thread of a vector of threads of a graphical application. Each thread in the vector of threads are processed in a non-stalling manner. The PE stores data in a first predetermined set of the plurality of registers in the register file memory that has been generated by processing the at least one thread and that is to be routed to a first stallable logic unit that is external to the PE. The LSU is coupled to the register file memory, and the LSU accesses the data in the first predetermined set of the plurality of registers and routes to the first stallable logic unit.

25 Claims, 5 Drawing Sheets

(56) References Cited

U.S. PATENT DOCUMENTS

| | | |
|---|---|---|
| 9,513,905 B2 | 12/2016 | Smelyanskiy et al. |
| 10,043,232 B1* | 8/2018 | Ramadoss .................. G06T 1/20 |
| 2005/0114560 A1 | 5/2005 | Coleman et al. |
| 2006/0004995 A1* | 1/2006 | Hetherington ........ G06F 9/3885 |
| | | 712/235 |
| 2006/0206692 A1* | 9/2006 | Jensen .................. G06F 9/3802 |
| | | 712/215 |
| 2009/0164758 A1 | 6/2009 | Haertel |
| 2011/0040955 A1 | 2/2011 | Hooker et al. |
| 2013/0238877 A1 | 9/2013 | Lee et al. |
| 2016/0349832 A1 | 12/2016 | Jiao |

\* cited by examiner

SYSTEM AND METHOD FOR MAINTAINING DATA IN A LOW-POWER STRUCTURE

CROSS-REFERENCE TO RELATED APPLICATION

This patent application claims the priority benefit under 35 U.S.C. § 119(e) of U.S. Provisional Patent Application No. 62/486,957, filed on Apr. 18, 2017, the disclosure of which is incorporated herein by reference in its entirety.

TECHNICAL FIELD

The subject matter disclosed herein relates to a graphics processing unit (GPU). More particularly, the subject matter disclosed herein relates to a system and method for maintaining data in a low-power structure.

BACKGROUND

A GPU executes a graphics program that may be associated with an application. A GPU may include a general-purpose, programmable engine that may be used to execute, for example, a shader program (shader). A unified GPU architecture in which the same programmable engine, which may be referred to as a shader core, runs each of a number of programs for a particular graphics configuration. Given the nature of graphics programs, GPUs are highly parallel machines having large collections of threads running in parallel. A highly parallel system often moves large quantities of data between different portions of the system—an operation that tends to consume a relatively large amount of power. Accordingly, a low-power design becomes exceedingly important if a GPU is designed to be part of a hand-held device.

SUMMARY

An example embodiment provides a GPU that may include a register file memory, a processing element (PE) and a load-store unit (LSU). The register file memory may include a plurality of registers. The PE may be coupled to the register file memory, and the PE may process at least one thread of a vector of threads of a graphical application in which each thread in the vector of threads is to be processed in a non-stalling manner, and the PE may store data in a first predetermined set of the plurality of registers in the register file memory that has been generated by processing the at least one thread and that is to be routed to a first stallable logic unit that is external to the PE. The LSU may be coupled to the register file memory, and the LSU may access the data in the first predetermined set of the plurality of registers and may route the data to the first stallable logic unit. The GPU may further include a work-order hopper memory coupled to the LSU in which the work-order hopper memory may be capable of storing at least one work-order message associated with processing of the at least one thread of the vector of threads of the graphical application by the PE, and in which the at least one work-order message may include a first location of the first predetermined set of the plurality of registers storing the data that is to be routed to the first stallable logic unit. The at least one work-order message may further includes a second location of a second predetermined set of the plurality of registers in the register file memory indicating where to store a result of the first stallable logic unit.

An example embodiment provides a GPU that may include a PE, an instruction pipeline parser and an LSU. The PE may process at least one thread of a vector of threads of a graphical application in which each thread in the vector of threads is to be processed in a non-stalling manner. The instruction pipeline parser may generate a work-order message if an instruction of the at least one thread of a vector of threads of the graphical application includes an operation of routing data to a first stallable logic unit that is external to the PE. The work-order message may include a first location where to store data processed by the PE that is to be routed to the first stallable logic unit. The LSU may include a work-order hopper memory capable of storing the work-order message. The LSU may receive the work-order message in the work-order hopper memory and may route the data at the first location to the first stallable logic unit. The PE may include a register file memory that includes a plurality of registers in which the first location where the data is stored includes a first set of the plurality of registers in the register file memory. The work-order message may further include a second location of a second predetermined set of the plurality of registers in the register file memory indicating where to store a result of the first stallable logic unit.

One example embodiment provides a method to process a graphics application that may include: generating data in a PE by processing at least one thread of a vector of threads of the graphical application in which each thread of the vector of threads is to be processed in a non-stalling process, and the data may be routed to a stallable process that is external to the non-stalling process; storing the data in a first predetermined set of a plurality of registers in a register file memory in which the register file memory may be coupled to the PE; accessing the data stored in the first predetermined set of the plurality of registers by an LSU coupled to the register file memory; and routing by the LSU the accessed data to the stallable process. The method may further include: generating a work-order message by an instruction pipeline parser if an instruction of the at least one thread of the vector of the graphical application includes an operation of routing data to the stallable process in which the work-order message may include a first location of the first predetermined set of the plurality of registers storing the data that is to be routed to the stallable process. The work-order message may further include a second location of a second predetermined set of the plurality of registers in the register file memory indicating where to store a result of the stallable process.

One example embodiment provides a method to process a graphics application that may include: generating at an instruction pipeline parser a work-order message if an instruction of the graphical application includes an operation of routing data to a stallable process in which the graphical application may include at least one vector of threads in which each thread is to be processed in a non-stalling process, and in which the work-order message may include a first location where to store data generated by executing the instruction; storing the work-order message in a work-order hopper memory of an LSU; generating data in a PE by executing the instruction in the non-stalling process on at least one thread of a vector of threads of the graphical application in which the generated data may be routed to the stalling process; storing the data in a first predetermined set of a plurality of registers in a register file memory in which the first predetermined set of the plurality of registers corresponding to the first location, and the register file memory may being coupled to the PE; accessing by the LSU the data stored in the first predetermined set of the plurality of registers; and routing by the LSU the accessed data to the stalling process.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing particular exemplary embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement the teachings of particular embodiments disclosed herein.

Unless otherwise defined, all terms (including technical and scientific terms) used herein have the same meaning as commonly understood by one of ordinary skill in the art to which this subject matter belongs. For example, the term "mod" as used herein means "modulo." It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. The term "software," as applied to any implementation described herein, may be embodied as a software package, code and/or instruction set or instructions. The term "hardware," as applied to any implementation described herein, may include, for example, singly or in any combination, hardwired circuitry, programmable circuitry, state-machine circuitry, and/or firmware that stores instructions executed by programmable circuitry. The modules may, collectively or individually, be embodied as software, firmware and/or hardware that forms part of a larger system, such as, but not limited to, an integrated circuit (IC), system on-chip (SoC) and so forth.

The subject matter disclosed herein provides a GPU system that includes a PE that runs a non-stalling primary process without utilizing skid buffers and/or enablable flip-flops. All aspects of the non-stalling primary process that may include a potentially unknown or an unknowable latency may be executed externally to the non-stalling process, thereby effectively processing the potentially unknown or unknowable latency in a non-stalling manner.

In one embodiment, the GPU system may include a non-stalling central engine that exchanges data with a potentially stalling second process through a relatively large static random access memory (SRAM). The non-stalling central engine may include a PE that dynamically addresses the SRAM so that the non-stalling primary process may generate and store data in the SRAM. The potentially stalling second process may access the SRAM to perform additional functions on the stored data for operations having an unknown or unknowable latency. Accordingly, the efficient storage structure of a GPU system disclosed herein permits inputs that may be used for fulfilling operations in the non-stalling primary process, but may have stallable aspects, to be generated and maintained in the storage structure until such time as the second process may complete the potentially stallable aspects.

Additionally, the non-stalling characteristics of the PE allows the PE to be configured to use less chip area and dissipate less power in comparison to a conventional graphics PE that includes a stalling pipeline. That is, the configuration of a non-stalling primary process exchanging data through an SRAM provides a relatively low-power GPU system that uses a minimum amount of storage space. The current technology used to fabricate storage as SRAM allows a relatively large SRAM to be more efficient in terms of area and power in comparison to fabricating storage as flip-flops, which may be used in conventional GPUs. Additionally, using a fewer number of relatively larger SRAMs, as disclosed herein, may be more cost effective than using numerous relatively smaller SRAMs because the internal SRAM structures may be more efficiently amortized over the fewer, relatively larger SRAMs than over numerous, relatively smaller SRAMs.

In one embodiment, a PE may be coupled to a relatively large SRAM, referred to herein as a vector register file (vRF), that may hold data that is being emitted by a non-stalling process executed by the PE. The data may be emitted from the non-stalling process in response to an explicit emit instruction of an instruction set architecture (ISA) or emitted implicitly as part of any other instruction that may cause data to leave the PE. Specific data that is being emitted may be contained in an identifiable emit buffer that is part of the vRF. From a programming point of view, using an emit buffer may be efficient because an explicit instruction slot is not used, thereby eliminating overhead associated with additional program fetch energy and latency, and reducing program storage space.

In one embodiment, a GPU system may provide a shader core engine that may operate in a non-stalling manner and any operations that may stall may be executed outside of the non-stalling shader core engine without using flip-flop banks for data input and output. The shader core engine may be configured so that operations in the core always take an identical number of cycles. All large data being processed by the shader core engine remains in SRAM-based register files and management of a particular register file may be a combination of a shader-program compiler, which may perform various optimizations of the register file configuration at compile time, and of one or more run-time sequencers that may provide exact addresses for registers during operation. Interchange of data through the SRAM-based register files may be flexible and may involve minimal compiler knowledge that relates to register file allocation within the SRAM-based register files. So, in contrast to transferring an entire large-data message that includes all the extended parts within the message, the subject matter disclosed herein essentially provides a call-by-reference (rather than by-value) process in which a small description, or a work order, indicates where to find the parts of the large message is sent to a stallable engine.

Instead of running all instructions of a shader program explicitly in the exact sequence presented by a graphics application, the subject matter disclosed herein may permit operations (compiled instructions in the general-purpose processor portion of a modern GPU) to either execute in sequence or may cause an operation to be placed in a queue for later processing when any aspect of the operation includes an unknown latency aspect (for example, dependence on some external resource.) Thus, the subject matter disclosed herein provides an efficient decoupling technique for a small set of instructions that provides an efficient non-stalling core with a stallable auxiliary processing unit that handles the operations placed in the queue, such as memory I/O (i.e., texture and attribute fetches) and other graphics operations outside of the core. Although instruction operations may not physically run in the application-provided order, the instruction operations logically remain in order in which the instructions that may stall are run in separate queues.

In one embodiment of a GPU system disclosed herein, the general-purpose processing for a shader may be performed by one or more PEs that may be grouped into one or more PE clusters (PECs). A PE, as used herein, refers to a generic processor that is capable of executing instruction streams in a non-stalling manner. A PEC, as used herein, refers to a multiplicity of PEs that form a parallel processing array. In one embodiment, there may be four PEs per PEC. In another embodiment, the number of PEs per PEC may be different from four PEs per PEC. For each cycle, a PE processes the same instruction on each thread in a collection of threads, or a warp. For high performance, a PE may be a multiple-thread machine. In one embodiment, a PE may be a single-instruction-multiple-thread (SIMT) engine.

A thread, as used herein, refers to a point of control that may execute instructions. A trace, as used herein, refers to a collection of instructions that are run in a non-stalling continuous sequence. A trace may use one or more cycles to execute. For example, one cycle may be dedicated to each instruction in a trace. The active state of each thread may be controlled by a corresponding bit in an execution mask. A warp, as used herein, is a collection of a plurality of threads, and a warp may refer to all the threads executing in a cycle.

A program executed on a PE may include one or more traces and may make use of an external stallable unit, such as an LSU. An LSU, as used herein, refers to a processing unit that handles stallable operations, such as loads and stores, and other potentially stallable operations, such as, but not limited to, texture accesses or use of shared resources, such as math co-processors, etc. One or more LSUs may be associated with each PEC.

Figure 1:
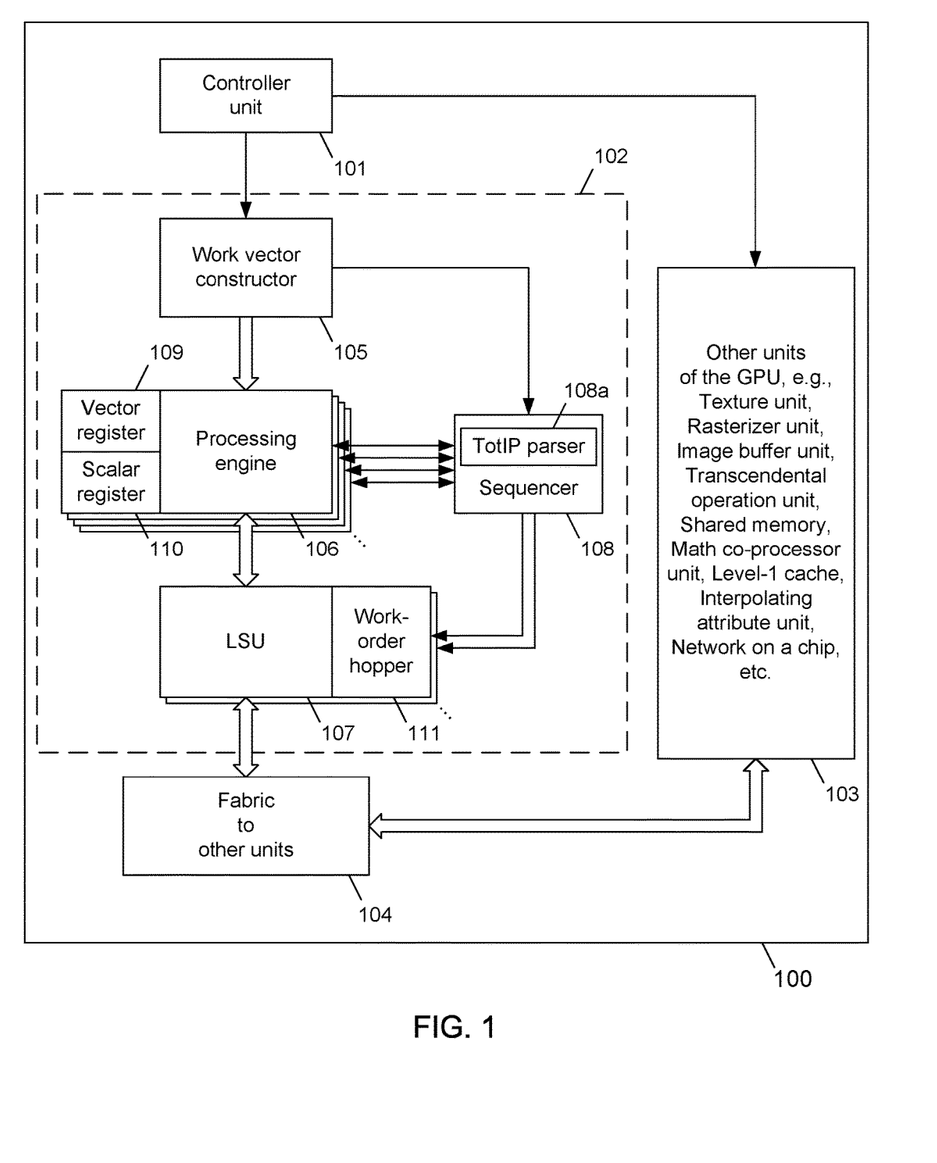
FIG. 1 depicts an example embodiment of a GPU system according to the subject matter disclosed herein.

FIG. 1 depicts an example embodiment of a GPU system 100 according to the subject matter disclosed herein. The GPU system 100 may include a controller unit 101, a PEC 102, other units 103 of the GPU system 100, and a communication fabric 104 between the PEC 102 and the other units 103. The controller unit 101 may be coupled to the PEC 102 and the other units 103 to provide overall control over the operation of the GPU system 100. The other units 103 may include stallable units, such as, but not limited to, a texture unit, a rasterizer unit, an image buffer unit, a transcendental operation unit, shared memory, a math co-processor unit, level-1 cache, interpolating attribute unit, and a network on a chip (NOC).

The PEC 102 may include a work vector constructor 105, one or more PEs 106, one or more LSUs 107 and a sequencer 108. As depicted in FIG. 1, the PEC 102 may include four PEs 106, although PEC 102 may include any number of PEs 106. Depending on relative processing requirements, a single LSU 107 may service multiple PEs 106, thereby further reducing overall area and storage requirements. In the example embodiment depicted in FIG. 1, two PEs 106 of a PEC 102 may utilize a single LSU 107, although PEC 102 may include any number of LSUs 107. One or more of the work vector constructor 105, the PEs 106, the LSUs 107 and the sequencer 108 may be embodied as modules.

Each PE 106 may include a vRF 109 and a scalar register file (sRF) 110. A vRF, as used herein, refers to a relatively large memory that supports a PE 106 by providing per-thread storage, and may be generally accessible by the PE 106 and by the LSU 107 associated with the PE 106. An sRF, as used herein, refers to a memory that supports a PE 106 by provide scalar data storage, such as, but not limited to thread execution masks. The vRF 109 may be generally much larger that the sRF 110. Additionally, the vRF 109 and the sRF 110 may be configured to provide sufficient storage to allow switching between a plurality of warps that may be executed on the PE 106 in order to maximize efficiency if one or more warps cannot proceed because the warp may be waiting for resources. In one embodiment, the vRF 109 and the sRF 110 may be formed from SRAM.

The work vector constructor 105 is coupled to the one or more PEs 106 and the sequencer 108. The work vector constructor 105 operates to assemble work items that are put into threads that are processed by PEC 102. In the context of graphics, the work items may include, but are not limited to, pixels or vertices that are to be worked on.

The sequencer 108 may include a top of the instruction pipeline (TotIP) parser 108*a* that may include logic that parses program instructions executed by the PEC 102 to determine whether an instruction may include a stallable aspect and, if so, the TotIP parser 108*a* generates a message, referred to herein as a work order, that may be stored in a work-order hopper 111 in the LSU 107. A work order, as used herein, may be an instruction packet that may contain a location of an emit buffer (in the vRF 109 and/or the sRF 110) and one or more actions (i.e., data manipulation) that are to be performed on data in the emit buffer.

A PE 106 may operate to process a plurality of threads forming a warp in which each of the threads of the warp is non-stallable. Many of the messages that a PE 106 may originate may be large due to the thread-parallel nature of the GPU system 100. Thus, a PE 106 may be a producer of large amounts of large data and an associated LSU 107 may route the large data and, in some cases, operate on the data "in flight," such as if the data may contain an array of addresses for a load or a store that may be coalesced to improve access efficiencies to and/or from caches. Interaction between a PE 106 and an LSU 107 may be through a vRF 109 and a sRF 110 so that the cost in terms of energy and overhead of sending and storing inherently large amounts of data may be minimized. The large data generated by a PE 106 remains local in the vRF 109 and/or the sRF 110 until it may be used by another unit 103. The LSU 107 may include a dedicated interface to the vRFs of the PEs 106, and/or may cycle steal the read/write access ports to the PE SRAM.

Figure 2:
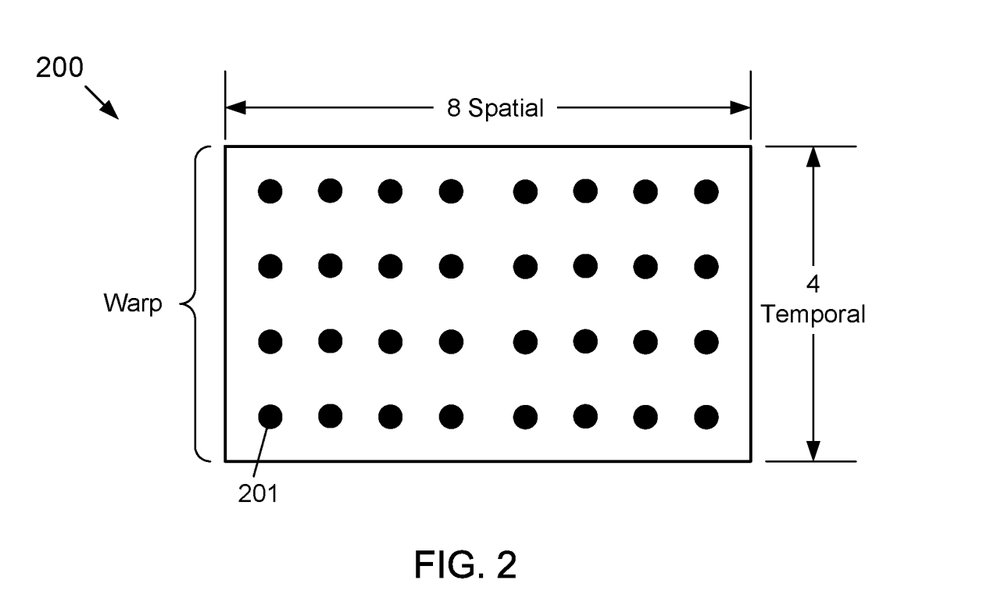
FIG. 2 depicts an example embodiment of a warp that includes a single-instruction-multiple-thread grouping of threads organized as eight threads in a spatial dimension and four threads in a temporal dimension.

A warp may be configured to manage threads in a spatial dimension and in a temporal dimension. FIG. 2 depicts an example embodiment of a warp 200 that includes an SIMT grouping of 32 threads 201 organized as eight threads in a spatial dimension and four threads in a temporal dimension. The eight threads operating in parallel over four cycles accomplish 32 units of work over the time/space shown in FIG. 2. The eight-wide nature of the execution may be processed by eight lanes of PEs 106, that is, eight arithmetic logic units in parallel. The four threads in the temporal dimension may be managed as four system-clock beats in the calculation unit pipeline. The four-beat organization may be referred to herein as a Pass. It should be understood that the subject matter disclosed herein may support an arbitrary number of warps and an arbitrary number of register files in the vRF 109 and the sRF 110.

Each thread in a warp may have independent resources and data that the thread may be manipulating, and thus the amount of thread data for a warp may become large, particularly if the data are floating-point values. For example, thirty-two 32-bit values form 1k-bit of data each time an instruction calls for any data of a thread. The wide width of a warp may be used for operations that are both internal to a PE 106 and when communicating with an external unit, i.e., another unit 103 in FIG. 1.

Figure 3:
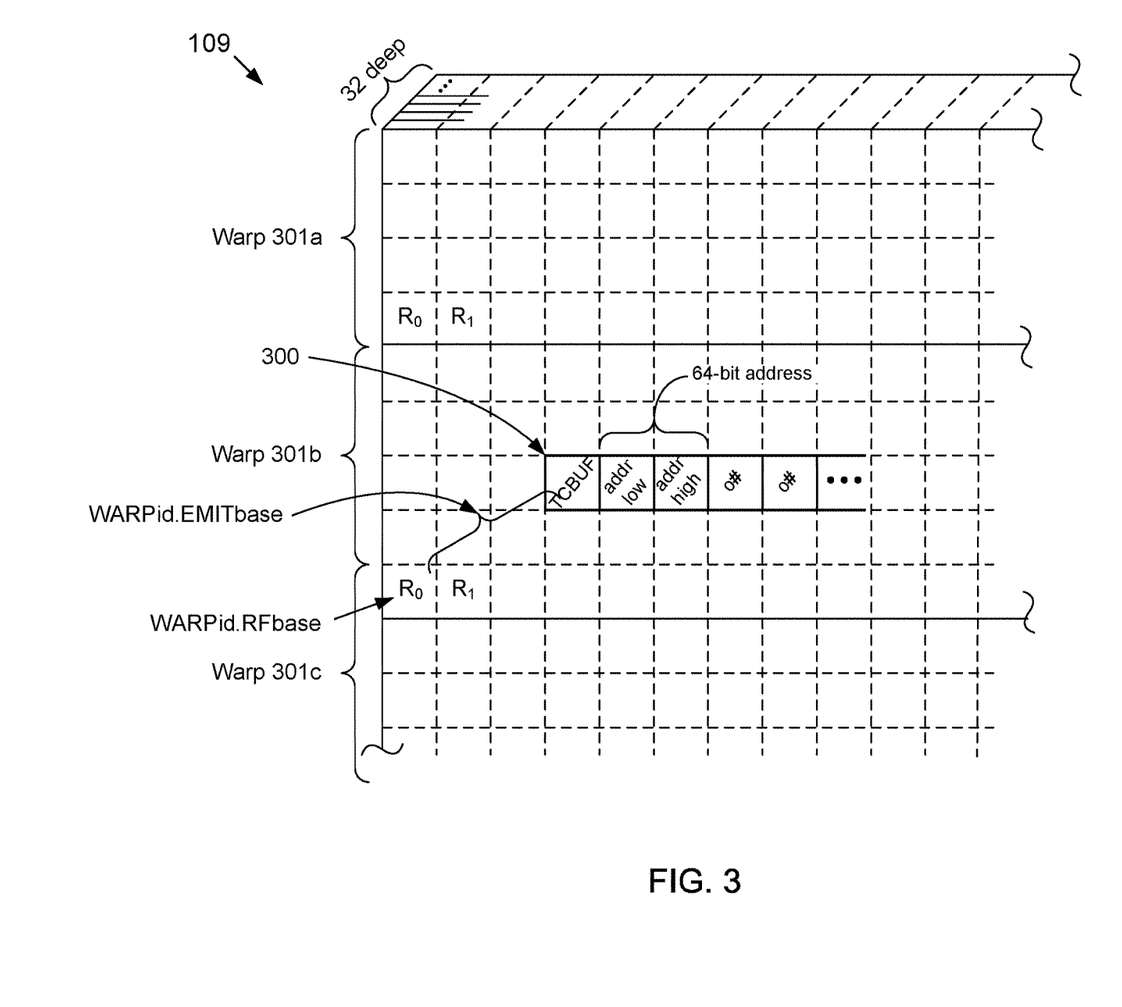
FIG. 3 depicts an example embodiment of an emit buffer according to the subject matter disclosed herein.

Referring back to FIG. 1, in addition to the division of labor between a PE 106 and an LSU 107, that is, a PE 106 producing data and an LSU 107 routing and operating on the data, there may be a delay between when the data is created and when the data is processed by the LSU 107. The delay may range from almost zero to a fairly long time if the LSU 107 happens to be occupied at the moment with another PE 106 of the PEC 102, or otherwise delayed awaiting a response from another unit 103. Rather than having a large buffer in the LSU 107, the PE-produced large data may be maintained in a logically formed sub-buffer within the vRF 109 of the PE 106. Such a sub-buffer may be referred to herein as an emit buffer 300 (FIG. 3). An emit buffer 300 may hold data being emitted by the PE 106, whether due to an explicit emit instruction in the ISA or implicitly as part of any other instruction that causes data to leave the PE 106. The PE 106 may compute where to write into an emit buffer 300 and where the LSU 107 may read from the emit buffer 300.

The LSU 107 manages the distribution of data from the PE 106 to the rest of the system 100 that is external to the PE 106. In one embodiment, the LSU 107 may include a variable-depth queue, referred to herein as a work-order hopper 111. A work-order hopper, as used herein, refers to an input queue structure that may be used for passing work orders from the non-stalling engine (i.e., the PEs 106) to the stallable engine portion of the GPU system 100. In one embodiment, the depth of the work-order hopper 111 may be set to 16. In other embodiments, the depth of the work-order hopper 111 may be different from 16.

The work-order hopper 111 may be a smaller storage than the vRF 109, but is able to support background execution of work-order instructions without adversely affecting the main PE execution engine. The actual dimensions of the work-order hopper 111 may be completely flexible. Work orders, which are written by the TotIP 108*a*, are placed into the work-order hopper 111 of an LSU 107 and may be processed in order of arrival, but asynchronously from the provoking PE instructions. That is, the LSU 107 may process work orders in the work-order hopper 111 in the same order in which the work orders were queued in the work-order hopper 111. Alternatively, if an LSU 107 may be servicing more than one PE 106, the LSU 107 may use a round-robin or other arbitration scheme to select which work order/PE to service next.

The portion of the process involving the LSU 107 begins with the TotIP parser 108*a* in the sequencer 108 parsing an instruction and sending a work order to the work-order hopper 111 in the LSU 107. In one embodiment, the latency in the path from sequencer 108 to the work-order hopper 111 of the LSU 107 may be sufficiently long that any operations involved by the PE 106 to produce the data that is to be worked on by the work order is available.

Table 1 sets forth one embodiment of an example four-field 32-bit work order that provides a minimal amount of information that may be used to process data in a vRF 109 and/or a sRF 110. The first field, bits [31:24], may be used to select or identify a work order and the following [23:15]

bits may provide modifiers to the work order. The subsequent [14:7] and [6:0] fields may be used for respectively accessing data in the vRF and the sRF of the PE. During processing of a work order by an LSU 107, masks and other data, for example, may be needed to properly execute a work order and return results of the work order to the appropriate register file(s).

TABLE 1

An example configuration of a 32-bit work order

| | |
|---|---|
| [31:24] | 8-bit Type of work order |
| [23:15] | 9-bit Work order specific field |
| [14:7] | 8-bit vRF location |
| [6:0] | 7-bit sRF location |

FIG. 3 depicts an example embodiment of an emit buffer 300 according to the subject matter disclosed herein. An emit buffer 300 may be a sequence of register locations located within a set of registers forming the vRF 109 of a PE 106 and that have been allocated to a warp. The vRF 109 for a PE 106 may be divided into a set of spaces based on information contained in a WARPid.RFbase register that indicates where a particular vRF space is located for a particular warp. The WARPid.RFbase register may be maintained in the sequencer 108. In one embodiment, there is a copy of each of these registers per PE that the sequencer 108 controls. Accordingly, a vRF 109 may be configured to contain a plurality of emit buffers 300. A particular emit buffer 300 may be located and accessed based on, for example, the contents of a WARPid.RFbase register plus the contents of a WARPid.EMITbase register. The WARPid.EMITbase register may be maintained in the sequencer 108. As entries are to be added to the emit buffer (as determined by the TotIP parser 108a, the sequencer 108 increments the WARPid.EMITbase register. In one embodiment, the lifespan of an emit buffer 300 may be equivalent to the length of a trace. Thus, data in an emit buffer 300 may be created and consumed within a single trace.

As depicted in FIG. 3, a vRF 109 includes an arrangement of registers $R_0, R_1, \ldots$, that have been allocated to each of one or more warps. It should be understood that although only warps 301a-301c are depicted in FIG. 3, a vRF 109 may include an arbitrary number of warps. Each warp 301 may be configured to include, for example, 32 threads, which may be similar to the example warp depicted in FIG. 2.

Data in an emit buffer 300 is directly correlated to a work order sent to the work-order hopper 111 of an LSU 107. More specifically, the data in an emit buffer 109 may contain large vector values that are to be emitted by a PE 106, and the corresponding work order may contain a specific request relating to the data in the emit buffer 300. As, for example, the instructions of a shader program execute, if there are data to be passed from a PE 106 to a stallable unit 103, the data that is to be passed may be deposited in an emit buffer 300 within the vRF 109 for the PE 106. An exact list of ISA-level instructions that may result in data being emitted to an emit buffer may be determined at design time, i.e., synthesis time, or may be tabulated in a run-time maintained table. A list of example instructions is set forth Table 2. In either case, during runtime, each time an instruction is parsed by, for example, the TotIP parser 108a in the sequencer 108 may determine whether the instruction is run completely in a PE 106 or whether the instruction may also include a portion of the instruction that may be queued in a LSU 107 for a further stallable processing.

FIG. 3 may depict an example situation in which a trace execution has executed an instruction specifying, for example, a texture coordinate buffer, an output a memory access that utilizes a 64-bit address, and then two different writes to an output register (o#). A texture coordinate buffer (TCBUF), as used herein, refers a remote storage element (i.e., remote from a vRF) that may be used to receive and store texture coordinates. The trace being executed in FIG. 3 may also include an instruction, such as FMUL $TCBUF_2$, $R_1$, $R_2$, that may cause the product $R_1 \times R_2$ to be placed in the first entry of the emit buffer 300. The subscript "2" of the TCBUF destination in the FMUL instruction may be part of a work order that may be sent to the work-order hopper 111 of the LSU 107. When the LSU 107 performs the work order, the LSU 107 makes a request to the vRF 109 to access the location of the emit buffer 300 and, with a tag specifying, for example, TEX.TA.TCBUF (i.e., the texture coordinate buffer in the addressing sub-module in the texture unit), which indicates that the operation is a texture coordinate buffer load operation and that the TEX.TA.TCBUF being accessed is number 2, the vector of data to write to the TEX.TA.TCBUF is available at the location in vRF 109 identified as the emit buffer 109. It should be noted that reference to an operation as a "load" or as a "store" operation is with respect to the unit or memory that is being serviced. That is, a write going into the text buffer unit entity are termed a "load," such as a "TCBUF load," even though from the perspective of the LSU 107 or PE 106, the operation may be thought of as store operation.

Continuing with the example situation depicted in FIG. 3, sometime later in the instructions of the trace, there may be a memory access that utilizes a 64-bit address. This may result in two 32-bit address parts being written into the emit buffer 300 by the PE 106. The large vector data (i.e., the addresses) are maintained in the vRF 109, and this memory operation may be communicated to the LSU 107 as the LSU 107 makes requests to the vRF 109 based on the work orders in the work-order hopper 111 of the LSU 107.

Still later in the trace, there may be instructions referencing output registers (i.e., o#), for example, the instruction FADD $O_3$, $R_{14}$, $R_6$, which leads to the specific situation depicted in FIG. 3. The emit buffer 300 may contain a vector value that is to be written to o[3], and the work order contains the constant "3". Subsequently, a second output-register write occurs and the second vector may be written to the emit buffer 300 and correspondingly, a second o# work order is sent to the work-order hopper 111 of the LSU 107. The current shader type of the shader program may be indicated by a PEC.WSQ.TotIP register. The PEC.WSQ.TotIP register may be located in the sequencer 108. The shader type may be used for, among other purposes, to distinguish how to process an o# operation. It may also be indicated in the work order sent to the LSU 107 whether the o# is for a front-end shader, in which case the output-register write is for shared memory, or whether the o# is for a pixel shader, in which case the output-register write is for a rasterizer sub-system.

Table 2 sets forth an example list of ISA instructions (or variants of instructions), such as in the case of writing to a texture coordinate buffer, that may include actions associated with an emit buffer 300. The second column in Table 2 entitled "Form of specifying" indicates what field(s) the sequencer 108 may examined by the TotIP parser 108a to determine whether an emit buffer 300 may be used for the particular instruction. For some cases, inspection of the instruction opcode may be sufficient, but in other cases the determination may be further qualified.

TABLE 2

Example instructions and instruction variants
including emit buffer actions

| Instruction | Form of specifying | Notes |
|---|---|---|
| TCBUF | Destination field of an ISA instruction | specifies TCBUF |
| SAMPLE | ISA instruction | SAMPLE ISA instruction encountered |
| SFU | ISA instructions | for any of: $1/x$, $1/sqrt(x)$, $sin(x)$, $cos(x)$, $log_2(x)$, $exp_2(x)$ |
| F*.64 | ISA instruction with modifiers | Double-precision floating-point operations |
| IMUL | ISA instruction | Integer multiplication is handled by the PEC.RCU.DPU |
| o# (FE) | Destination field of an ISA instruction | Front-End Shader output register writes to Shared Memory |
| o# (PS) | Destination field of an ISA instruction | Pixel Shader output register writes to Raster sub-system |
| LD (L1C) | ISA instruction with modifiers | Load from cacheable storage |
| ST (L1C) | ISA instruction with modifiers | Store to cacheable storage |
| LD (SM) | ISA instruction with modifiers | Loads from Shared Memory, such as during a Compute Shader |
| ST (SM) | ISA instruction with modifiers | Stores to Shared Memory, such as during a Compute Shader |
| ATOMIC (L1C (Level 1 cache)) | ISA instruction with modifiers | ATOMIC operations to cacheable storage |
| ATOMIC (SM) | ISA instruction with modifiers | ATOMIC operations to Shared Memory |
| Attribute load | ISA instruction with modifiers | Attribute load for Vertex Shader |
| CLD | ISA instruction | Constant Load Instruction processed via the Vertex attribute address generator |
| EMIT | ISA instruction | General purpose mechanism to fill EMIT buffer, possibly for debug or bug work-around use. |

TABLE 2-continued

Example instructions and instruction variants
including emit buffer actions

| Instruction | Form of specifying | Notes |
|---|---|---|
| INTERP_* | ISA instructions | Pull IPA |
| IMGLDA | ISA instruction | [Image] Load Address |
| IMGLD | ISA instruction | Image Load |
| IMGST | ISA instruction | Image Store |

From the second column in Table 2, detecting whether an instruction includes an emit-buffer operation may involve decoding a bit more than just a major/minor opcode and additional fields in the instruction word may need to be inspected. For example, a double-precision floating-point operation may be distinguished from a single-precision floating-point operation because only a double-precision floating point operation may evoke emit-buffer actions, whereas a single-precision floating-point operation may be computed within the PE 106 without any extra actions by the sequencer 108 and without any interaction by the LSU 107. Distinguishing between double- or single-precision floating-point operations may include inspecting a precision type field of an instruction.

Figure 4:
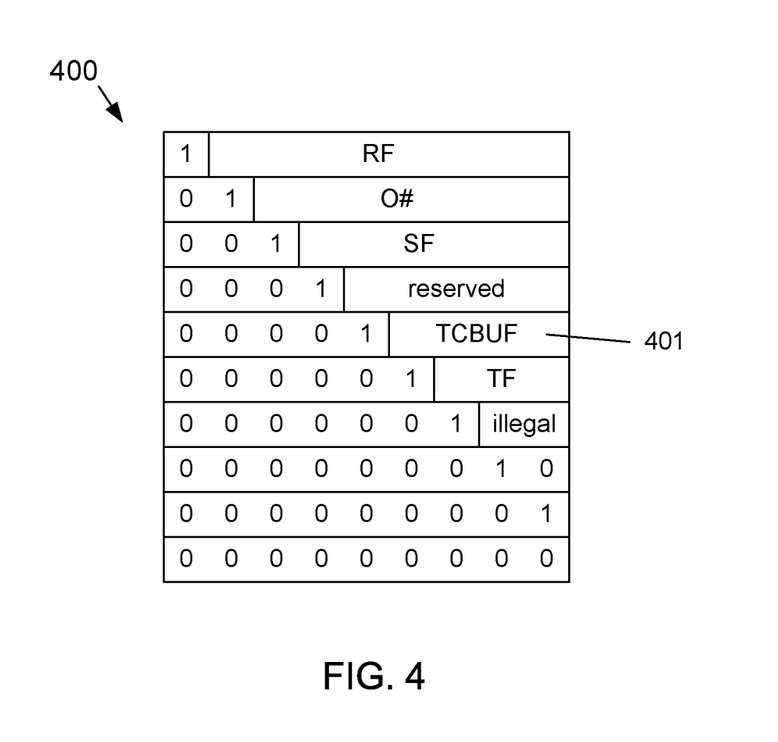
FIG. 4 depicts an example field that a top of the instruction pipeline parser may inspect for an example TCBUF instruction when determining that an example emit buffer 400 is to be used as part of the processing of a TCBUF-related instruction.

Additional details of how the TotIP parser 108a detects the cases shown in Table 2 are provided in Table 3. The two rightmost columns of Table 3 respectively present in one embodiment the number of vector and scalar registers consumed in an emit buffer 300 when the particular instruction is processed. FIG. 4 depicts the example field 401 that the TotIP parser 108a may inspect for an example TCBUF instruction when determining that an example emit buffer 400 is to be used as part of the processing of a TCBUF-related instruction.

TABLE 3

Additional details for identifying scenarios provoking an emit-buffer

| Instruction | Fields to inspect to detect EMIT Buffer case | Actions to take | Num vRF | Num sRF |
|---|---|---|---|---|
| TCBUF load | Destination field of an ISA instruction specifies TCBUF: | WSQ.TotIP to provide sRF and vRF locations to PEC.PE, send work order to LSU. | 0/1 | 1 |
| SAMPLE | ISA instruction | WSQ.TotIP to provide sRF location to PEC.PE, send work order to LSU. | 0/0 | 2 |
| SFU.RCP/RSQ/LOG2/EXP2 | ISA instructions with modifier | WSQ.TotIP to provide sRF and vRF locations to PEC.PE, send work order to LSU. | 0/1 or 1/0 | 1 |
| SFU.SIN/COS | ISA instructions with modifier | Pre-processes | 0/1 | 1 |
| FMTC.64 | ISA instruction with modifier (unary 64-bit operation) | WSQ.TotIP converts the two vRF values to absolute and sends these to PEC.LSU in the work order. No EMIT buffer operation. (Operands are the source operand and the destination.) | 2/0 | 1 |
| FMUL.64 | ISA instruction with modifier (binary 64-bit operation) | WSQ.TotIP converts the three vRF values to absolute and sends these to PEC.LSU in the work order. No EMIT buffer operation. | 4/0 | 1 |
| FMAD.64 | ISA instruction with modifier (trinary 64-bit operation) | WSQ.TotIP converts the four vRF values to absolute and sends these to PEC.LSU in the work order. No EMIT buffer operation. | 6/0 | 1 |

TABLE 3-continued

Additional details for identifying scenarios provoking an emit-buffer

| Instruction | Fields to inspect to detect EMIT Buffer case | Actions to take | Num vRF | Num sRF |
|---|---|---|---|---|
| IMUL o# (FE) | ISA instruction Destination field of an ISA instruction. PEC.WSQ knows the type of Shader a Trace belongs to and detects the o# specifier (MSbits of destination == 2'b01) | WSQ.TotIP follows description in <too complicated and beyond the scope of this IDF to include herein.> | 0/1 | 1 |
| o# (PS) | Destination field of an ISA instruction (same as for Front-End Shader) | WSQ.TotIP follows algorithm described in <too complicated and beyond the scope of this IDF to include herein.> | varies | |
| LD (L1C) | ISA instruction with modifiers-see ISA CFS | WSQ.TotIP to reserve EMIT buffer space for the address | 0/1 | 1 |
| ST (L1C) | ISA instruction with modifiers-see ISA CFS | WSQ.TotIP to reserve EMIT buffer space for the address | 1/1 | 1 |
| LD (SM) | ISA instruction with modifiers-see ISA CFS | WSQ.TotIP to reserve EMIT buffer space for the address | 0/1 | 1 |
| ST (SM) | ISA instruction with modifiers-see ISA CFS | WSQ.TotIP to reserve EMIT buffer space for the address | 1/1 | 1 |
| ATOMIC (L1C) | ISA instruction with modifiers-see ISA CFS | | 1/1 or 2/1 | 1 |
| ATOMIC (SM) | ISA instruction with modifiers-see ISA CFS | | | 1 |
| Attribute load | ISA instruction with modifiers-see ISA CFS | | | |
| CLD | ISA instruction | Constant load | 2/0 | 1 |
| EMIT | ISA instruction | Place data into EMIT Buffer and send generic message to LSU. Used for debug and as work-around for any problems in other instructions. | 0/1 | |
| INTERP_* | ISA instruction | WSQ.TotIP to reserve EMIT buffer, PEC.PE to morph the instruction into a BFI (bit-field insertion) | 0/1 | |
| LDA | - n/a - | Despite the name possibly suggesting a Load/Store operation, LDA (Load Address) is performed fully within the PEC.PE | 0/0 | 0 |
| IMGLDA | ISA instruction with modifiers to distinguish among the three sub-cases of IMGLDA/IMGLD/IMGST. | WSQ.TotIP to provide sRF location to PEC.PE, send work order to LSU. (Looks like a SAMPLE instruction to the WSQ) PEC.LSU will later reuse this same sRF location to store format conversion information looked up from the i# resource and needed for a subsequent IMGLD instruction. Instruction will specify vRF location of where addresses are to be stored once computed. | 2/0 | 1 |
| IMGLD | | | 0/0 | 1 |
| IMGST | | | 0/1 | 1 |

For timing reasons, the TotIP parser 108a may not modify any of the instructions in a trace before sending instructions to the PE 106, but instead may if appropriate provide alternate destination field bits that the PE 106 may use later in a pipeline in lieu of destination field bits of the instruction.

The general rules for determining the number of vRF and sRF entries shown in Table 3 may include the following considerations. For allocation of an emit buffer, there may be two counters, EmitVrf and EmitSrf, in which 0, 1 or 2 vRF entries may be allocated per source or destination vector depending on the instruction at hand. The vRF allocation pointer may be decremented by the number of vRF entries allocated. Four sRF entries may be allocated to contain the header, execution mask, and various other fields. The exact dimensions of each sRF entry, and number of entries present, may be dictated by design considerations. The first sRF block may be allocated from S63 . . . S60, and extends downward in units of four. At the completion of an instruction, a work order may be passed from TotIP parser 108a to the work-order hopper 111 of an LSU 107. The LSU may read the sRF and vRF entries. In another embodiment, addressing into the vector and scalar register files may proceed counting downward, and thus at the beginning of a trace, EmitVrf may be vRFSize−1, and EmitSrf may be 60 . . . 63. If vRF space is not being used as entries in an emit buffer, a compiler may use the unallocated space to hold persistent data, thereby reducing the total memory footprint needed for the GPU system 100.

An emit buffer may be fundamentally limited by the number of headers stored in sRF. In one embodiment, eight sRF headers may be allowed. A compiler may use more headers by not placing persistent data in sRF entries that would be overwritten by headers. In particular, an example instruction FMAD.64, which may be sent to a double-precision unit, only may use one sRF header, but six vRF entries to provide for three 64-bit operands in which each vRF is a vector of 32-bit entries, and thus are used pairwise to form the operands. The maximum number of sRF headers consumed may be one per ISA instruction.

The emit buffer may provide operands for a remote unit {transcendentals, double precision, texture address calculations, . . . }. A remote operation may need one or more operands, such as sin(x) or A*B respectively involving one or two operands. "Dynamic" source operands may be copied into newly allocated entries in an emit buffer. A dynamic operand may be an operand that may come from, for example, a scalar register, a constant scratch register, an immediate value that may be moved to an emit buffer location (such as to store an ISA-level immediate value) or a forwarded value (i.e., output of a previous instruction that may be used directly without having been stored in the vRF as an intermediate step); or a local temporary register. Each such operand may consume an emit buffer entry. An emit buffer entry may occupy one {Q, H, S} or two {D} vectors in the emit buffer. As used herein, the initials Q, H, S, and D respectively stand for quarter, half, single, and double width and respectively represent 8-, 16-, 32-, and 64-bit quantities.

In one embodiment, each instruction that uses an emit buffer may consume one emit buffer header (four sRF entries) serving as the header. If an instruction may be calculated in a remote unit, the vRF source operand do not occupy the emit buffer, but may be accessed directly from their original location(s). Such a non-entry in an emit buffer may still consume four sRF entries, which serve as the header for, for example, an execution mask, etc. If an instruction delivers a result through the emit buffer, the result may be produced by a non-Remote calculation instruction, thus a source emit buffer use and destination emit buffer uses may be orthogonal. If an instruction delivers a result through the emit buffer, an emit buffer entry may be allocated with one or two vRF entries, and four sRF entries. The calculated result may be placed in an allocated entry. Scalar register files may be setup so that an LSU 107 may route data to a targeted function unit at the appropriate time.

Figure 5:
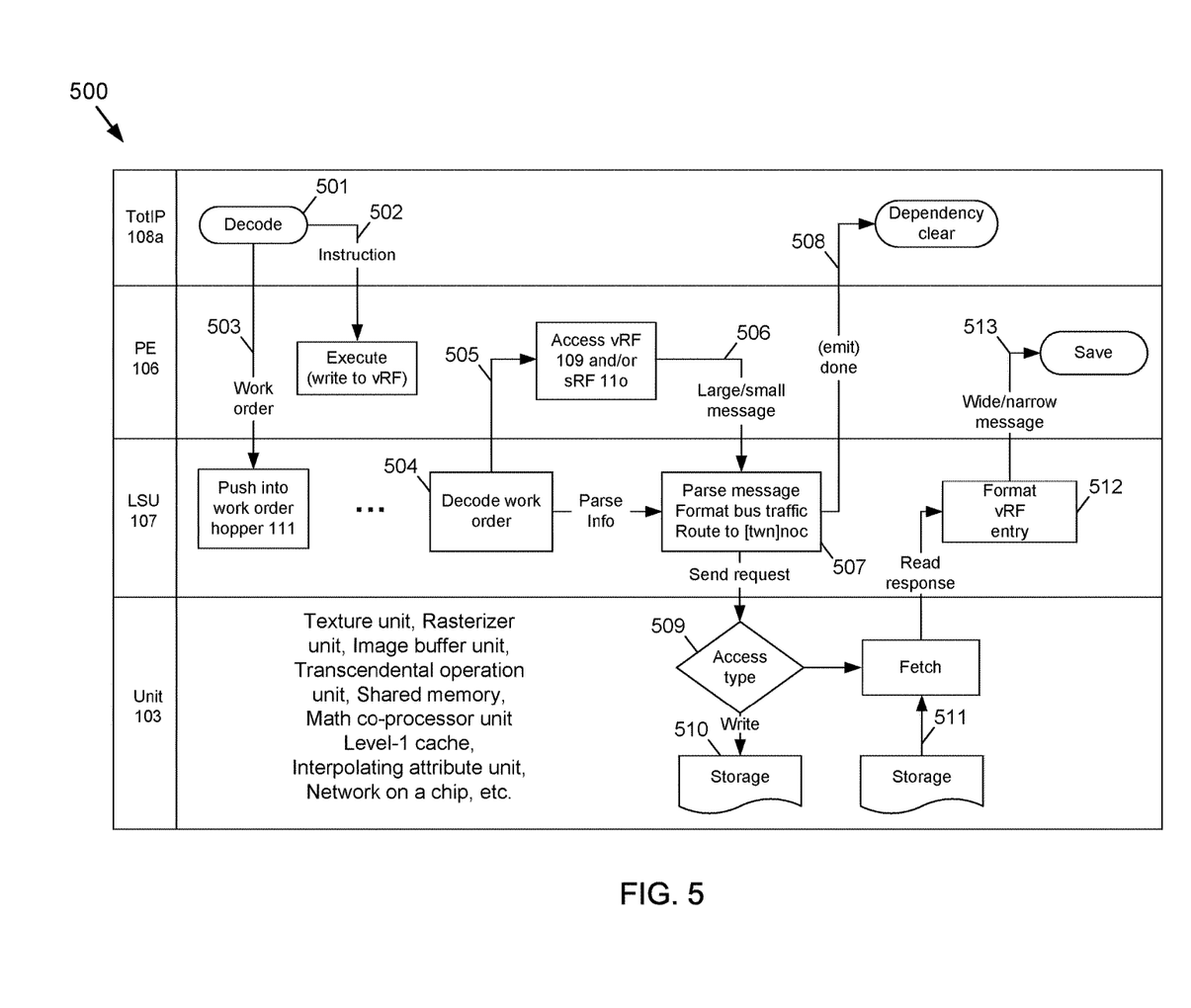
FIG. 5 depicts a sequence diagram of an example memory interaction between a PE and an LSU according to the subject matter disclosed herein.

FIG. 5 depicts a sequence diagram 500 of an example memory interaction between a PE 106 and an LSU 107 according to the subject matter disclosed herein. At 501 in FIG. 5, the TotIP parser 108a (FIG. 1) parses an instruction that is part of an instruction stream of, for example, a shader program, that is being executed and as part of the operation of the instruction determines whether the instruction should be directed to only the non-stalling process of the system or both the non-stalling process and to the stallable process of the system. For this example, the TotIP parser 108a determines that the instruction should be directed to both the non-stalling process and the stallable process, so at 502 the instruction, such as a write to the vRF 109, is sent to the PE 106 for execution, and at 503 a work order is sent to the work-order hopper 111 of the LSU 107. The work order may contain information relating to the location of an emit buffer that is to be operated on by the instruction. For any operation that may have an associated return value, which may be essentially all operations other than a store operation, a work order in the work-order hopper 111 also my include a small pointer as to where the data is to be returned, that is, where to return the data in the vRF 109 of the PE.

Part of the operation of forming the work order may also include some functionality of the PE 106. Examples of instructions that may cause a work order to be input to the work-order hopper 111 of an LSU 107 may include, but are not limited to, load from memory, store to memory, an atomic memory operation, send data to texture coordinate buffer, request a filtered texture sample, a transcendental operation, log and antilog functions, reciprocal, reciprocal square-root, read from an attribute interpolator, and double-precision operations. Some of the operations may be graphics specific, such as operations with references to a texture and attribute interpolator, however, it should be understood that any stallable unit 103 that may be outside of the non-stalling PEC 102 may be accessed via a work order in a work-order hopper.

For example, consider the instruction SIN $R_3$, $R_2$, which may be used to compute the sine of the value in a register $R_2$ and places the result in a register $R_3$. Operations, such as transcendental operations, may be performed external to the PE 106 in, for example, a shared math co-processor (i.e., a unit 103) that presents a stallable timing profile. The TotIP parser 108a decodes the SIN operation and generates a work order while also providing an instruction to the PE 106. The PE 106 may be responsible for any local processing, such as operand range reduction, and also for saving relevant information that may be used by the co-processor when the vector of transcendental operations is performed. The highly parallel nature of the GPU architecture 100 provides that the SIN instruction is given for the entire vector of threads over which the PE operates. Thus, the PE 106, the LSU 107, and the transcendental unit 103 (not shown) must all be able to access the particular vector state in effect at the time the SIN instruction is encountered. This includes other information containing fields, such as, but not limited to, masks that may be used to indicate which threads may or may not be active, any virtualization pointers for functions, such as register renaming, and any other modes (i.e., precision, format conversion, etc.). All of the fields form a large amount of data that would be expensive and cumbersome to store in a queue in the LSU 107. Instead, a small pointer is kept as a reference into the large local storage of the vRF 109 and the sRF 110 in the PE 106 where the bulk data is maintained in-situ.

Later at 504, the LSU 107 processes through the work orders in the work-order hopper 111 and at 505 makes one or more accesses to the data in the vRF 109 and/or the sRF 110 of the PE 106. Certain operations may be unary and may involve a single memory access while other operations, such as an ATOMIC compare and swap operation, may involve three operands and a corresponding number of accesses. In one embodiment, the operands may be referenced in the work order using an 8-bit value even though a size of each operand may be 1024 bits (thirty-two 32-bit operands) and, therefore, the savings in area and power consumption may be significant.

The data stored in the vRF 109 and/or the sRF 110 that is to be operated on by the LSU 107 may be accessed at 506 and at 507 may be processed by, for example, being parsed, formatted and/or routed a destination unit 103 for further processing depending on the instruction. If processing is complete at 507, a dependency clear message is sent to the TotIP parser 108a at 508. If, at 507, a unit 103 is to be accessed, the type of access is determined at 509. If the access is a write, at 510, the write is executed. If the access is a read, the read is executed at 511, formatted at 512 for storage in the vRF 109 at 513.

As another example, consider an example shader program running in a PE 106 that is to write data to a texture coordinate buffer as part of preparing to access a texture map, which may be a standard operation in computer graphics. A texture unit 103 may be a major sub-system that may be shared among various processing engines and may stall and, therefore, may present unknowable latencies. The texture unit may, therefore, be accessed via the LSU 107 as an external unit with respect to the non-stalling PE 106. Accessing the texture coordinate buffer may involve the following sequence. The TotIP parser 108a may decode the reference to TCBUF, provide an emit buffer address to the PE 106, and generate a work order to be stored in the work-order hopper 111 of the LSU 107. The PE 106 computes data that will be routed to the texture unit 103 and stores these data in registers corresponding to the emit buffer address provided by the TotIP parser 108a. The LSU 107 receives and processes the work order, and makes a read request to the emit buffer in the vRF 109 for data to write to the texture unit 103. The texture unit 103 receives the data and writes the data to memory of the texture unit 103.

In one embodiment, writes into a texture coordinate buffer may be coded in a shader program using a special $TCBUF_n$ destination field in the instructions. For example, the example instruction FMUL TCBUF R1, R2 may operate to initiate a load to the texture buffer TCBUF under software control by a compiler. At runtime, the instructions may be parsed and the presence of a special $TCBUF_n$ destination field may be detected. In response, the TotIP parser 108a may determine that the TCBUF in the instruction should be replaced with an actual location within the vRF 109 of the PE 106, i.e., a next available space in an emit buffer 300. Additionally, a work order corresponding to this location may be input to the work-order hopper 111 of the LSU 107. The PE 106 may receive a modified instruction, such as FMUL $R_{emit}$ R1, R2 in which $R_{emit}$ may be a value populated by a simple example calculation $R_{emit}$=WARPid.EMITbase [7:0]. Additionally, the TotIP parser 108a may also provide the PE 106 with a pair of signals indicating that an execution mask may be saved and the address where to save the execution mask in the sRF 110. The TotIP parser 108 may then generate a work order for the LSU 107 that may contain an opcode for moving data to the TCBUF and supply an address for the TCBUF.

For the present example, during work-order processing, once the LSU 107 has access to the texture unit 103 (that is, the texture unit 103 may or may not be available at any given moment and may present varying latencies and throughputs), the LSU 107 may send a message in which the LSU 107 provides 1024 bits of data (as 256 bits/cycle in the one embodiment) containing either thirty-two 32-bit fp32 words or sixty-four 16-bit fp16 half-words; and execution mast bits that may be used by the texture unit to limit processing to only active threads, which may be for functional correctness and to save power by not updating TCBUF values for inactive threads.

Note, this particular example sequence is, from the perspective of the PE a write-only operation. The shader program has written into the texture coordinate buffer and, at some time outside the non-stalling sequence within the PE 106, this operation completes. Later, when the shader program may read from the texture unit, a new work order may be generated that may request the read and provide an address into the vRF 109 where the return data is to be written.

As will be recognized by those skilled in the art, the innovative concepts described herein can be modified and varied over a wide range of applications. Accordingly, the scope of claimed subject matter should not be limited to any of the specific exemplary teachings discussed above, but is instead defined by the following claims.

What is claimed is:

1. A graphics processing unit (GPU), comprising:
a register file memory comprising a plurality of registers;
a processing element (PE) coupled to the register file memory, the PE to process at least one thread of a vector of threads of a graphical application, each thread in the vector of threads to be processed in a non-stalling manner, a first set of data used by the PE processing the at least one thread of the vector of threads being stored in the register file memory, and the PE to store a second set of data in a first predetermined set of the plurality of registers in the register file memory that has been generated by processing the at least one thread and that is to be routed to a first stallable logic unit that is external to the PE; and
a load-store unit (LSU) coupled to the register file memory, the LSU to access the second set of data in the first predetermined set of the plurality of registers and route the second set of data to the first stallable logic unit, the first set of data used by the PE processing the at least one thread of the vector of threads remaining stored in the register file memory.

2. The GPU of claim 1, further comprising a work-order hopper memory coupled to the LSU, the work-order hopper memory capable of storing at least one work-order message associated with processing of the at least one thread of the vector of threads of the graphical application by the PE, the at least one work-order message being based on an instruction that is to be processed in the non-stalling manner and to be processed in a stallable manner, and the at least one work-order message including a first location of the first predetermined set of the plurality of registers storing the second set of data that is to be routed to the first stallable logic unit.

3. The GPU of claim 2, wherein the at least one work-order message further includes a second location of a second predetermined set of the plurality of registers in the register file memory indicating where to store a result of the first stallable logic unit.

4. The GPU of claim 2, further comprising an instruction pipeline parser to generate the at least one work-order message if an instruction of the at least one thread of the vector of threads of the graphical application includes processing the at least one thread in the non-stalling manner and an operation of routing the second set of data to the first stallable logic unit.

5. The GPU of claim 1, wherein the register file memory comprises a vector register file memory and a scalar register file memory.

6. The GPU of claim 1, wherein the PE is to further process at least one thread of each of a plurality of vectors of threads of the graphical application, each thread in each vector of threads to be processed in a non-stalling manner.

7. The GPU of claim 1, further comprising a plurality of register file memories, a plurality of PEs, and a plurality of LSUs, wherein each PE of the plurality of PEs is coupled to a corresponding register file memory, each PE of the plurality of PEs to process at least one thread of a corresponding vector of threads of the graphical application, each thread in the corresponding vector of threads to be processed by the PE in the non-stalling manner, a first set of data used by each PE processing the at least one thread of the corresponding vector of threads being stored in the corresponding register file memory, and each PE to store a second set of data in a corresponding second predetermined set of the plurality of registers in the register file memory corresponding to the PE, the second set of data that is to be stored being generated by the PE processing the at least one thread of the corresponding vector of threads and to be routed to a second stallable logic unit corresponding to the PE that is external to the PE; and wherein each LSU is coupled to at least one register file memory, each LSU to access the second set of data in the second predetermined set of the plurality of registers of each register file memory to which the LSU is coupled and to route the second set of data to the second stallable logic unit corresponding to the PE that generated the second set of data, the first set of data used by the PE to generate the second set of data remaining stored in the register file memory corresponding to the PE.

8. The GPU of claim 7, wherein the first or the second stallable logic unit comprises a texture unit, a rasterizer unit, an image buffer unit, a transcendental operation unit or a math co-processor.

9. A graphics processing unit (GPU), comprising:

a register file memory comprising a plurality of registers;

a processing element (PE) coupled to the register file memory, the PE to process at least one thread of a vector of threads of a graphical application, the at least one thread of the vector of threads to be processed in a non-stalling manner, a first set of data used by the PE processing the at least one thread of the vector of threads being stored in the register file memory;

an instruction pipeline parser to generate a work-order message if an instruction of the at least one thread of a vector of threads of the graphical application includes processing the at least one thread in the non-stallable manner and an operation of routing a second set of data generated by processing of the at least one thread in the non-stallable manner to a first stallable logic unit that is external to the PE, the work-order message including a first location in the register file memory where to store the second set of data processed by the PE that is to be routed to the first stallable logic unit; and a load-store unit (LSU) including a work-order hopper memory capable of storing the work-order message, the LSU to receive the work-order message in the work-order hopper memory and to route the second set of data at the first location in the register file memory to the first stallable logic unit, the first set of data used by the PE processing the at least one thread of the vector of threads remaining stored in the register file memory.

10. The GPU of claim 9, wherein the PE is to further process at least one thread of each of a plurality of vectors of threads of the graphical application, each thread in each vector of threads to be processed in a non-stalling manner.

11. The GPU of claim 9, wherein the first location where the second set of data is stored includes a first set of the plurality of registers in the register file memory.

12. The GPU of claim 11, wherein the work-order message further includes a second location of a second predetermined set of the plurality of registers in the register file memory indicating where to store a result of the first stallable logic unit.

13. The GPU of claim 11, wherein the register file memory comprises a vector register file memory and a scalar register file memory.

14. The GPU of claim 11, further comprising a plurality of register file memories and a plurality of PEs, each PE is coupled to a corresponding register file memory, each PE of the plurality of PEs to process at least one thread of a vector of threads of the graphical application in the non-stallable manner, a first set of data used by the PE processing the at least one thread of the vector of threads being stored in the corresponding register file memory, and each PE to store a second set of data in a corresponding first predetermined set of the plurality of registers in the register file memory corresponding to the PE, the second set of data to be stored being generated by the PE processing the at least one thread of the vector of threads and to be routed to a second stallable logic unit that is external to the PE; and a plurality of LSUs, each LSU being coupled to at least one register file memory, each LSU including a work-order hopper memory capable of storing a work-order message, and each LSU to process a work-order message in the work-order hopper memory and to route the second set of data in the corresponding first predetermined set of the plurality of registers to the second stallable logic unit, the first set of data used by the PE corresponding to the LSU processing the at least one thread of the vector of threads remaining stored in the register file memory corresponding to the PE.

15. The GPU of claim 14, wherein the first or the second stallable logic unit comprises a texture unit, a rasterizer unit, an image buffer unit, a transcendental operation unit or a math co-processor.

16. A method to process a graphics application, the method comprising:

generating a first set of data in a processing element (PE) by processing at least one thread of a vector of threads of the graphical application, each thread of the vector of threads to be processed in a non-stalling process, the first set of data to be routed to a stallable process that is external to the non-stalling process, and a second set of data used by the PE processing the at least one thread of the vector of threads being stored in a register file memory;

storing the first set of data in a first predetermined set of a plurality of registers in the register file memory, the register file memory being coupled to the PE;

accessing the first set of data stored in the first predetermined set of the plurality of registers by a load-store unit (LSU) coupled to the register file memory; and routing by the LSU the first set of data to the stallable process, the second set of data used by the PE processing the at least one thread of the vector of threads remaining stored in the register file memory.

17. The method of claim 16, further comprising generating a work-order message by an instruction pipeline parser if an instruction of the at least one thread of the vector of threads of the graphical application includes an operation of routing the first set of data to the stallable process, the work-order message being based on an instruction that is to be processed in the non-stalling process and to be processed in a stallable process, and the work-order message including a first location of the first predetermined set of the plurality of registers storing the first set of data that is to be routed to the stallable process.

18. The method of claim 17, wherein the work-order message further includes a second location of a second predetermined set of the plurality of registers in the register file memory indicating where to store a result of the stallable process.

19. The method of claim 16, wherein the register file memory comprises a vector register file memory and a scalar register file memory.

20. The method of claim 16, wherein processing the at least one thread of a vector of threads of the graphical application comprises processing at least one thread of each of a plurality of vectors of threads of the graphical application, each thread in each vector of threads to be processed in the non-stalling process.

21. The method of claim 16, wherein the stallable process comprises an operation of a texture unit, a rasterizer unit, an image buffer unit, a transcendental operation unit or a math co-processor.

22. A method to process a graphics application, the method comprising:
  generating at an instruction pipeline parser a work-order message if an instruction of the graphical application includes an operation of processing at least one vector of threads in a non-stallable process and of routing a first set of data generated by processing of the one vector of threads to a stallable process, the work-order message including a first location where to store the first set of data generated by executing the instruction in a register file memory;
  storing the work-order message in a work-order hopper memory of a load-store unit (LSU);
  generating the first set of data in a processing element (PE) by executing the instruction in the non-stalling process on at least one thread of a vector of threads of the graphical application, the first set of data to be routed to the stalling process, a second set of data used by the PE by executing the instruction being stored in the register file memory;
  storing the first set of data in a first predetermined set of a plurality of registers in the register file memory, and the first predetermined set of the plurality of registers corresponding to the first location, and the register file memory being coupled to the PE;
  accessing by the LSU the first set of data stored in the first predetermined set of the plurality of registers; and
  routing by the LSU the first set of data to the stalling process, the second set of data used by the PE processing the at least one thread of the vector of threads remaining stored in the register file memory.

23. The method of claim 22, wherein the work-order message further includes a second location of a second predetermined set of the plurality of registers in the register file memory indicating where to store a result of the stallable process.

24. The method of claim 22, wherein the graphical application further comprises a plurality of vectors of threads in which each thread in each vector of threads is to be processed in the non-stalling process.

25. The method of claim 22, wherein the stallable process comprises an operation of a texture unit, a rasterizer unit, an image buffer unit, a transcendental operation unit or a math co-processor.

* * * * *